United States Patent [19]

Page, Jr.

[11] 4,060,268
[45] Nov. 29, 1977

[54] GUARD RAIL DEVICE

[76] Inventor: William H. Page, Jr., 200 Cemetary St., Oakland, Ill. 61943

[21] Appl. No.: 756,751

[22] Filed: Jan. 5, 1977

[51] Int. Cl.² ............................................. B60R 19/00
[52] U.S. Cl. ...................................................... 293/62
[58] Field of Search .................................... 293/62–65, 293/73, 74, 90, 100; 280/727

[56] References Cited

U.S. PATENT DOCUMENTS

| 357,800 | 2/1887 | Wescott | 293/62 |
|---|---|---|---|
| 526,532 | 9/1894 | Jennings | 293/62 |
| 1,558,253 | 10/1925 | Dunston | 293/90 |

FOREIGN PATENT DOCUMENTS

| 1,482,964 | 4/1967 | France | 293/62 |
|---|---|---|---|
| 330,889 | 6/1930 | United Kingdom | 293/62 |

Primary Examiner—Trygve M. Blix
Assistant Examiner—Stuart M. Goldstein

[57] ABSTRACT

A guard rail device for attachment to a large wheel diameter vehicle. The guard rail device is attached in each side of the vehicle and comprises:

A horizontal guard rail extending from about the rear of the front wheels to about the front of the rear wheels of the vehicle and extends substantially within the plane of the rear and front wheels of the vehicle. The guard rail device is positioned at such a height that when the vehicle is traveling across a road surface the guard rail does not touch the road surface. The guard rail device further has height adjustable attachment members for attaching the guard rail to the vehicle. When the vehicle is traveling across the road surface and an object collides into the side of the vehicle the guard rail prevents the object from falling under the large diameter rear wheels of the vehicle.

1 Claim, 2 Drawing Figures

GUARD RAIL DEVICE

BACKGROUND OF THE INVENTION

This invention relates to a guard rail device for protecting objects, for example, animals, people, automobiles, etc., from falling under the rear wheels of a large wheel diameter vehicle.

Very often when a large wheel diameter vehicle is traveling on a road, collisions may occur whereby certain objects, for example, animals, people, automobiles, etc., run into the side of the vehicle. This often results in the animal, person or automobile, etc., going under the vehicle and being dragged into the rear wheels of the vehicle. The results are often catastrophic in that people are injured and property destroyed.

The guard rail device in this invention is designed for use in large wheel diameter vehicles. By the use of the term "large wheel diameter vehicles" it is meant vehicles which have a larger wheel diameter than ordinarily encountered in the standard automobile. This usually means that the body of the truck between the rear and front wheels is elevated providing a space for animals, people and automobiles to be dragged under the rear wheels. Exemplary large wheel diameter vehicles are tractor trailers, railway coaches, freight cars, etc.

The following are the relevant prior art patents:

U.S. Pat. No. 2,002,832 describes a guard rail system for a semi-trailer and its associated tow car. The prime disadvantage of the device described in this patent is that the guard rail system is substantially the same height as the underside of tractor and does not really prevent the colliding object from being dragged into the rear wheels of the truck.

Another relevant prior art patent is U.S. Pat. No. 1,588,736 describing an automobile protector device. This device is not used on large wheel diameter vehicles. The device is mainly used for motor vehicles wherein there is little danger of an object of appreciable size being dragged under the automobile wheels.

SUMMARY OF THE INVENTION

The device of the present invention is unique in that it is a novel guard rail device for attachment to a large wheel diameter vehicle. Previously, as indicated above, there have been no guard rail devices which are used for attachment to large wheel diameter vehicles. The guard rail device of this invention prevents an object colliding with the vehicle from being dragged under the rear wheels of the vehicle. The guard rail device system of this invention further has a unique and unobvious adjustable attachment means for raising and lowering the guard rail for traveling over different type terrain. For example, a rough terrain would require a higher guard rail than a smooth terrain.

These and other features and advantages of the present invention will become more apparent from the following description when taken in conjunction with the accompanying drawing, which shows for purposes of illustration only, an embodiment in accordance with the present invention, and wherein:

DESCRIPTION OF THE PREFERRED EMBODIMENT

The present invention is a guard rail device for attachment to a large wheel diameter vehicle 1. The large wheel diameter vehicle, as stated previously, is any vehicle which has wheels 3 and 4 of above average size, i.e., larger than a typical automobile. For example, such large wheel diameter vehicles can be considered to be tractor trailers, semi-trailers, railway coaches, freight cars, etc.

The guard rail device of this invention can be utilized on any large wheel diameter vehicle where there is danger of an object colliding into the side of the vehicle and being dragged under the rear wheels 3.

Figure 1:
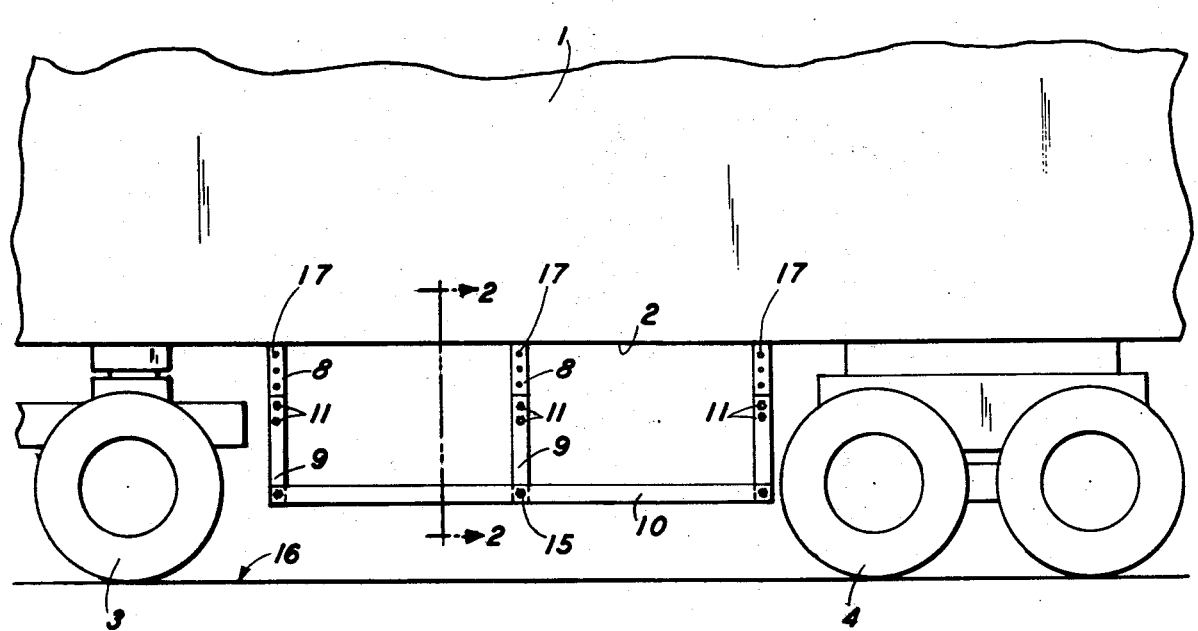
FIG. 1 is a side view of a large wheel diameter vehicle and a guard rail attached to the vehicle in accordance with the present invention.
Figure 2:
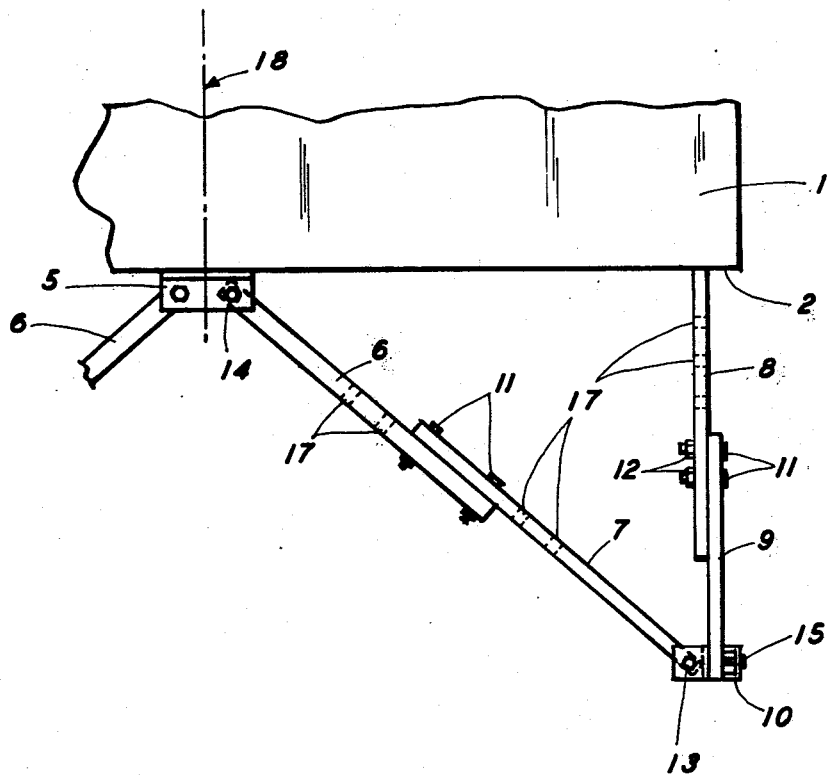
FIG. 2 is a sectional view taken along line 2—2 of FIG. 1 and shows in detail the novel and unique adjustable attachment means.

The guard rail device is comprised of a horizontal guard rail 10. The guard rail, and also the attachment means, may be constructed of any material to withstand the impact of an object colliding into the side of the vehicle. The horizontal guard rail 10 may be constructed of any convenient shape and preferably, as depicted in FIG. 2, is constructed of a channel shape material and bolted on with a bolt 15 to a vertical brace 9.

The horizontal guard rail 10 extends from about the rear of the front wheels 4 to about the front of the rear wheels 3. The horizontal guard rail also extends substantially within the plane of the rear and front wheels of the vehicle 1. The horizontal guard rail should be attached in such a manner that it does not interfere with the free rotation of the wheels and is positioned in such a manner that the wheels 3 and 4, if necessary, may be changed or repaired. This, in effect, means that if the horizontal guard rail 10 is to be permanently attached to the underside 2 of the vehicle 1 that the horizontal guard rail be positioned in such a manner that the wheels may be removed and repaired. However, if the guard rail is attached in such a manner that it is removable from the side of the vehicle then it may extend beyond a point where it would interfere with removal of the wheels. In this case, the horizontal guard rail is removed before repair or change of the wheels.

The horizontal guard rail 10 is positioned at such a height that when the vehicle 1 is traveling across a road surface 16 the guard rail 10 does not touch the road surface 16.

The guard rail is attached by an attachment means to the vehicle.

This invention contemplates the attachment of the attachment means to any portion of the vehicle 1, i.e., the side, underside, etc. Preferably, however, the attachment means is attached to the guard rail on the underside 2 of the vehicle 1.

Thus, when the vehicle 1 is traveling across the road surface 16 and an object, for example, an animal, person or automobile, etc., collides into the side of the vehicle 1 the guard rail 10 prevents the object from falling under the large diameter rear wheels 3 of the vehicle 1.

This invention contemplates an attachment means which is an adjustable attachment means and is capable of raising or lowering the guard rail to suit the various conditions of the road. For example, it is contemplated that when the road is rough, rocky terrain that the guard rail will be raised to a high position to avoid hitting rocks, bolders, etc., in the roadway. However, when the road is smooth, for example, turnpike driving, and there are very few obstructions in the road it is set at a low position. It is envisioned that, for maximum safety to objects colliding with the vehicle, that the guard rail be lowered to its lowermost position. The position of the guard rail above the road surface should be such so that it optimizes the safety of those objects colliding into the side of the vehicle, without interfering with the motion of the vehicle.

This invention also contemplates that the attachment means may be of a permanent type, i.e., the horizontal rail remains at a single height above the road. As noted above, however, preferably the attachment means is adjustable.

The attachment means is preferably comprised of a plurality of vertical braces 8 and 9 attached to the underside 2 of the vehicle 1 and to the horizontal guard rail 10. These vertical braces 8 and 9 may extend the length of the side of the vehicle 1. The vertical braces are substantially within the plane of the rear and front wheels of the vehicle.

The attachment means may be further comprised of a plurality of diagonal braces 6 and 7 running the length of the underside 2 of the vehicle 1 and attached to the underside 2 of the vehicle and to the horizontal guard rail 10. It should be noted that the diagonal braces 6 and 7 do not have to fall within the plane of the rear and front wheels, in fact, preferably the diagonal braces are attached to the underside of the vehicle at the center line 18 of the underside 2 of the vehicle 1.

The diagonal brace, 6 and 7, may be attached to the underside 2 of the vehicle 1 by a stationary bracket 5 and the diagonal braces, 6 and 7, may be attached to the guard rail 10 by a mounting means 13.

It is particularly preferred that the attachment means is an adjustable attachment means. The adjustable attachment means is preferably comprised of a plurality of upper vertical braces 8 attached to the underside 2 of the vehicle 1. The upper vertical braces are further attached to a plurality of lower vertical braces 9 which are attached to the horizontal guard rail 10. The vertical braces, as stated previously, are substantially within the plane of the rear 3 and front 4 wheels of the vehicle 1.

The adjustable attachment means is further comprised of a plurality of upper diagonal braces 6 which are attached to the underside 2 of the vehicle 1. Preferably the upper diagonal braces are attached to the underside 2 of the vehicle 1 through a stationary bracket 5 attached to the underside of the vehicle. The upper diagonal brace 6 is attached to the bracket by an upper rotatable mounting means 14.

The upper diagonal braces 6 are further attached to a plurality of lower diagonal braces 7. The lower diagonal braces 7 are attached to the horizontal guard rail 10. Preferably, the lower diagonal braces 7 are attached to the horizontal guard rail 10 by a lower rotatable mounting means 13.

The upper and lower diagonal and vertical braces are slidably mounted to each other in such a manner that the horizontal guard rail may be raised or lowered. As indicated previously, the upper diagonal braces 6 are rotatably mounted to the underside 2 of the vehicle 1 and the lower diagonal braces 7 are rotatably mounted to the horizontal guard rail 10.

The slidable mounts on the braces may consist of a plurality of vertical adjusting bolt holes 17 and diagonal adjusting bolt holes 17 which serve the purpose of mounting the upper and lower diagonal and vertical braces in different positions via a bolt 11. This invention, however, contemplates the use of any slidable mount means.

As previously stated, when the vehicle travels down the road and an object collides into the side, this object will be prevented from being dragged under the rear wheels of the vehicle by the guard rail. The guard rail may be adjusted to various heights to take under consideration the different types of road surfaces.

While I have shown and described several embodiments in accordance with the present invention, it is understood that the same is not limited thereto but is susceptible of many changes and modifications within the spirit of the present invention, and I, therefore, wish it to be understood that I intend to cover all such changes and modifications as encompassed by the appended claims.

I claim:

1. A height adjustable guard rail device for attachment to each side of a large wheel diameter vehicle to prevent an object colliding into the side of the vehicle from falling under the rear wheels thereof comprised of:
   a. a horizontal guard rail extending from about the rear of the front wheels to about the front of the rear wheels of the vehicle and extending substantially within the plane of the rear and front wheels of the vehicle, said guard rail positioned at such a height that as the vehicle travels across a road surface the guard rail does not touch the road surface:
   b. a plurality of upper vertical braces attached to the underside of the vehicle and attached to a plurality of lower vertical braces, the lower vertical braces being attached to the horizontal guard rail;
   c. a plurality of upper diagonal braces attached to the underside of the vehicle and attached to a plurality of lower diagonal braces, the lower diagonal braces being attached to the horizontal guard rail;
   d. wherein the upper and lower diagonal and vertical braces are slidably mounted to each other allowing for the guard rail to be secured in raised or lowered positions; and
   e. the upper diagonal brace is rotatably mounted to the underside of the vehicle and the lower diagonal brace is rotatably mounted to the guard rail.

* * * * *